United States Patent [19]

Abbott et al.

[11] 4,087,000

[45] May 2, 1978

[54] INDIVIDUAL DELIVERY OF OBJECTS

[75] Inventors: Robert William Abbott; Raymond Stanley Howard, both of Harrogate; John Arthur Rose, Knaresborough, all of England

[73] Assignee: Imperial Chemical Industries Limited, London, England

[21] Appl. No.: 619,869

[22] Filed: Oct. 6, 1975

Related U.S. Application Data

[63] Continuation of Ser. No. 473,634, May 28, 1974, which is a continuation of Ser. No. 271,970, Jul. 14, 1972, abandoned.

[30] Foreign Application Priority Data

Jul. 15, 1971 United Kingdom ............... 33309/71

[51] Int. Cl.² ............................................ B65G 47/26
[52] U.S. Cl. .................................................. 198/454
[58] Field of Search .................... 198/250, 287, 49, 51, 198/394, 416, 453, 454; 221/265, 263; 209/73

[56] References Cited

U.S. PATENT DOCUMENTS

| 743,686 | 11/1903 | Buehne | 221/263 X |
|---|---|---|---|
| 1,896,208 | 2/1933 | Thompson | 221/263 |
| 2,664,223 | 12/1953 | Dobkin | 221/265 |
| 2,872,019 | 2/1959 | Owen | 198/250 |
| 3,330,403 | 7/1967 | Roberts | 198/416 X |
| 3,628,694 | 12/1971 | Nichols | 221/265 |
| 3,696,968 | 10/1972 | Jaech | 221/265 |

Primary Examiner—Richard A. Schacher
Attorney, Agent, or Firm—Roderick B. Macleod

[57] ABSTRACT

Objects are delivered individually by feeding to temporary retention stations moved across stream. Objects of two sizes may be delivered in predetermined ratio. Associated counting means gives warning if predetermined rate of delivery not achieved.

1 Claim, 3 Drawing Figures

INDIVIDUAL DELIVERY OF OBJECTS

This is a continuation of application Ser. No. 473,634 filed May 28, 1974 which is a continuation of application Ser. No. 271,970 filed July 14, 1972 and now abandoned.

The present invention relates to the delivery of objects individually.

According to the present invention we provide an apparatus for the delivery of objects individually to a predetermined delivery point comprising forwarding means feeding a stream of objects at least one object in width towards a series of temporary retention stations for the objects, said retention stations being moved laterally and undirectionally across said stream of objects while each retaining an object and means being provided for disengagement of each object when it reaches said predetermined delivery point.

Preferably the stream of objects should be of more than one object in width to ensure that each of the temporary retention stations receives an object.

Preferably the forwarding means comprises a planar area on to which a continuous supply of objects is fed and to which is imparted an appropriate motion to ensure the forwarding effect.

The forwarding means may, for example, be an endless belt, which may move continuously, a location where the belt is planar being used for the forwarding. Otherwise a backward and forward motion may be used. For example the belt may repeatedly change its direction of motion with a forward and backward motion. Otherwise the planar area may comprise a member with flat upper surface to which is imparted a backward and forward motion. In either case the backward and forward movement may involve a slow forward and a rapid backward movement, thus giving a resultant forward urging to the objects. Said resultant forward urging may otherwise, or contributorily, be produced as the result of the planar area being at an angle to the horizontal, and/or by an associated oscillation with a vertical component the downwards movement of which coincides with the backward movement.

The planar area may comprise a rotating disc or a disc having an oscillatory motion about the axis of rotational symmetry, said axis being substantially vertically disposed. The oscillatory motion will be appropriately designed to provide the desired forwarding effect, for example by a slow rotational movement in one sense and a rapid rotational movement in the reverse sense. Otherwise, or in addition to the oscillatory motion about the axis of rotational symmetry, an oscillatory motion along the axis of rotational symmetry may be provided, the upward movement of which coincides with the rotational movement in the sense corresponding with the direction of forwarding the objects.

In the case wherein the forwarding means comprises a planar area on which the stream of objects is supported and by which the forwarding motion is imparted, and in the case wherein the objects are of uniform height, preferably the free space above the planar area is limited to a thickness less than twice the height of an object so as to prevent piling of one object on another. Furthermore the member limiting such free space should preferably be such as not to move in sympathy with the forwarding means. In either case the free space should preferably be of thickness equal to that of the height of one object plus a reasonable clearance allowing lateral movement, and in the case wherein there is a vertical component of movement of the planar area the free space should preferably be of thickness at least equal to the height of one object plus the amplitude of the movement.

The series of temporary retention stations may comprise a disc with indentations in its periphery each of size appropriate to accept one object. The disc is so located in relation to the stream of objects and driven in such manner that the series of indentations moves across the stream of objects when the disc is rotated. Disengagement of the objects, may, for example, be by the motion imparted to the object by the rotation of the disc bringing the object to a point where support from beneath it is discontinued and it falls into an appropriate delivery means.

Otherwise the series of temporary retention stations may comprise an endless belt with indentations appropriately situated and each of appropriate size to accept an object. The belt is arranged to move across the stream of objects with resultant feeding of an object into each indentation and transport of each object to appropriate disengagement and delivery means.

According to a further feature of our invention, a stream of objects comprising objects of more than one diametrical measurement and/or of more than one height may be forwarded towards the series of temporary retention stations, the stations being so constructed and/or so fed with the objects that a proportion of the stations accepts only one of the types of object while the other proportion accepts only the other type, or types, of object. By this means a predetermined ratio of the two types, or of more than two types where appropriate, may be made and the objects may be delivered at the predetermined point in a predetermined sequence. The direction of the divers objects into the appropriate retention stations can be facilitated by feeding separate streams each of only one type of object, in which case some of the types of objects may be acceptable at all of the retention stations, provided that objects acceptable at only a proportion of the retention stations are presented prior to the objects acceptable at all retention stations.

The delivery of a predetermined ratio of, for example, two sizes of object is not limited to the employment of one series of retention stations. Thus, for example, an endless belt bearing a series of temporary retention stations retaining only the larger objects and allowing the smaller objects to pass, may be followed by an endless belt bearing a series of temporary retention stations retaining the smaller objects. The two belts may be driven at such speed in relation to the frequency of the retention stations along them that the desired ratio of objects is delivered at the delivery points. Advantageously the speed of one or both belts may be capable of being preset so as to allow choice of the desired ratio of the two sizes of object and of the absolute rate of delivery of at least one type of object.

The apparatus according to our invention is of particular utility in the melt colouration of thermoplastic polymers, for use in melt extrusion to form filaments, films or mouldings. The colouration may be effected by soluble colours or insoluble colours. The colour may be formed into tablets by normal tabletting techniques and the tablets delivered at the appropriate frequency in relation to their weight, colour content, required concentration in the thermoplastic polymer and the rate of forwarding of the thermoplastic polymer to the extrusion apparatus, using the apparatus according to our invention for delivery of the tablets (the objects) at the necessary position in relation to the stream of thermoplastic polymer granules before melting or in relation to the melt stream after melting. Thereafter the colour is incorporated with the polymer melt by appropriate means. If it is desired to produce a colour in the thermoplastic polymer which results from the employment of two (or more) basic colours, one of the colours is made into one size of tablet and the other (or others) into another size (or other sizes) of tablet. Then by the use of the methods hereinbefore described the two (or more) types of tablet may be delivered at the appropriate point in a predetermined ratio to give the desired colour in the final thermoplastic polymer mix.

According to a still further feature of our invention, means is provided by which a continuous count may be made of the objects delivered by the apparatus and the count compared automatically with a predetermined rate of delivery.

Such counting should preferably be effected by means other than the interruption of a light beam, in the case of tablets of compressed powder since particles of the powder separating from the tablets will tend to mask the optical parts involved. Examples of such preferable methods are those involving the displacement of a member by contact with the tablet as it falls through space in delivery. The member displaced may be part of a proximity device, for example the member may be attached to the moving coil of a microphone, to a ferromagnetic member situated in a magnetic field or to one plate of a condenser held in position by resilient supporting means or a displacement transducer. Such displacement will then be detected by suitable electrical circuitry.

According to a still further feature of our invention, such means for counting the objects delivered may be associated with means for counting the potentially deliverable objects, for example the passage of indentations in the periphery of a disc which is part of the apparatus for delivering the objects. Thus the potential rate of delivery of objects can be compared by suitable electronic means with the actual rate of delivery and an alarm can be given when these counts are not equal and/or when they differ by a predetermined number.

A specific embodiment of our invention will now be described with particular reference to FIGS. 1, 2 and 3 in which.

Figure 1:
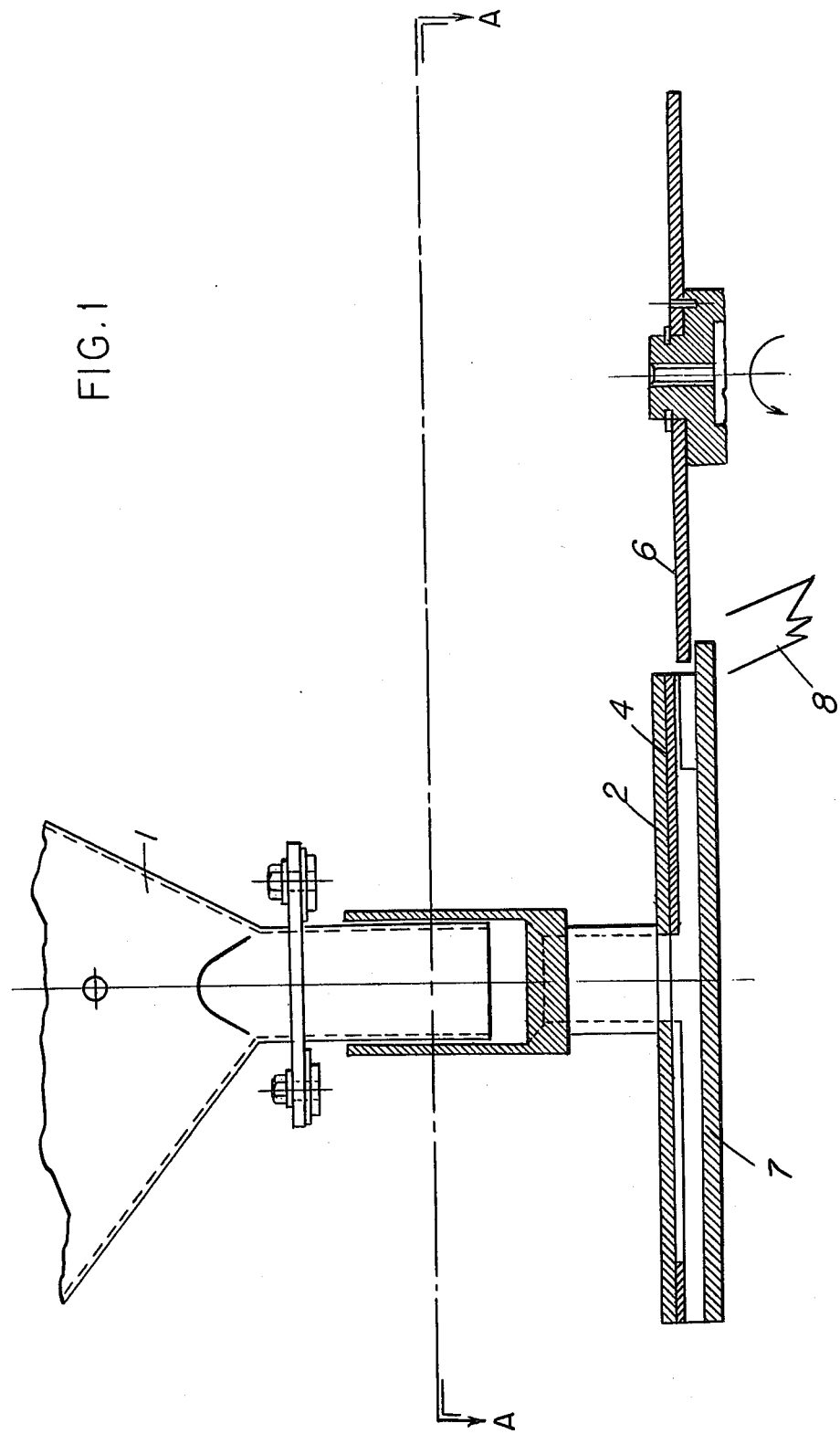
FIG. 1 shows a vertical section through an apparatus for delivery of objects.
Figure 2:
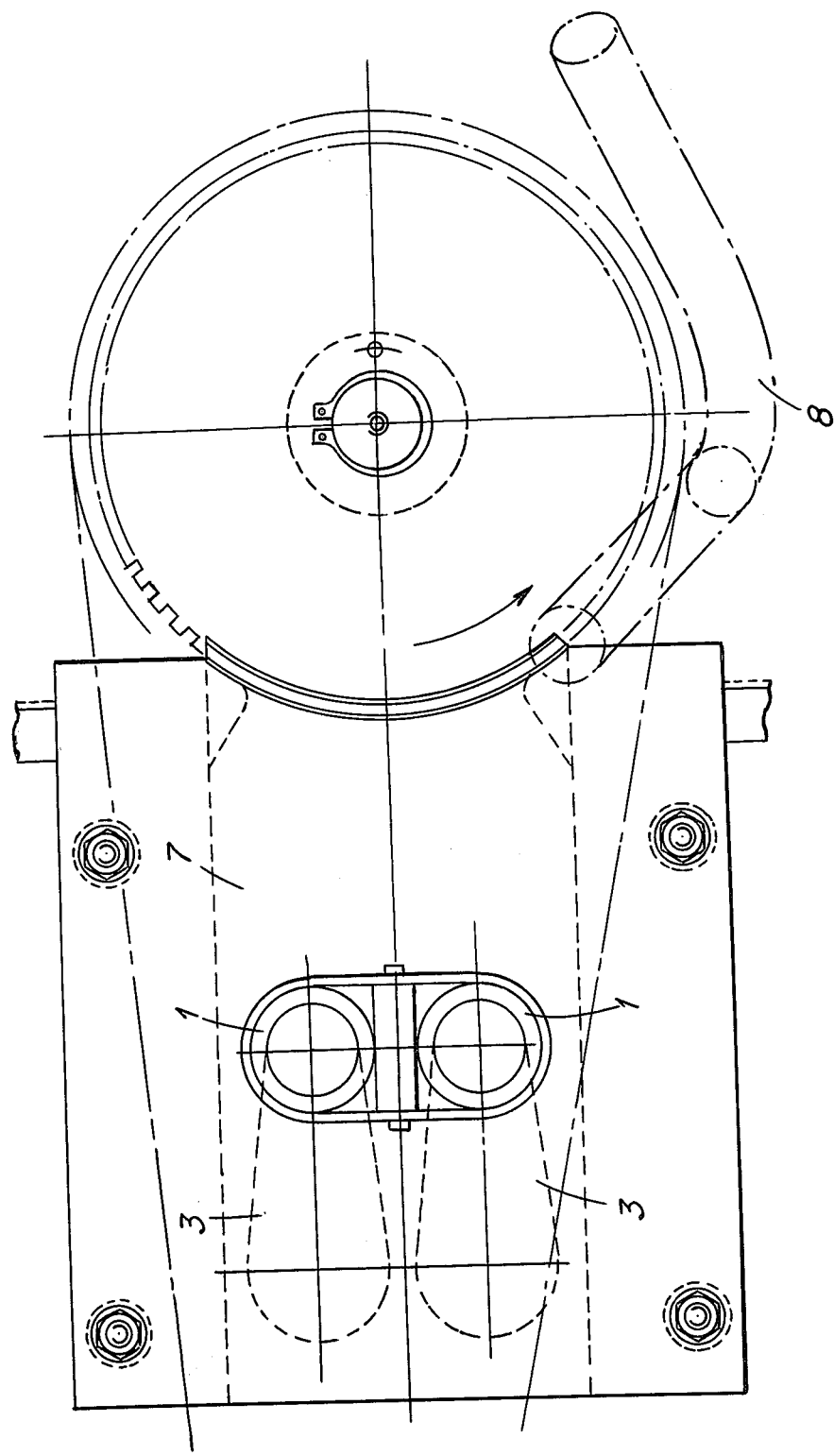
FIG. 2 shows a view from A — A of FIG. 1 in the direction of the arrows.

Referring to FIGS. 1 and 2, a pair of hoppers 1 feed through a fixed top-plate 2 of Perspex to a pair of elongated apertures 3 in a fixed aperture plate 4 extending from the bottom level of aperture plate 4 to the level of the upper surface of toothed wheel 6 plus a clearance space. At least the same magnitude of clearance is allowed between the lower surface of the toothed wheel 6 and the upper surface of the vibrator plate 7 in its resting state. Below aperture plate 4, is a vibrator plate 7 which is spring mounted and in its resting state is separated from aperture plate 4 by a distance "$x$" capable of being preset. Toothed wheel 6 bears in its periphery 50 teeth, equally spaced and each of 6 mm. depth measured radially, and of width 5 mm. at the periphery. Toothed wheel 6 is spaced laterally from the vibrator plate 7 by a small clearance to allow any powder from the objects handled to fall clear. Delivery tube 8 receives delivered objects and conducts them to the required point. The toothed wheel 6 is driven through transmission means by an electric motor (neither shown), the transmission means allowing preselection of speed of rotation. To the vibrator plate 7 is imparted movement by electromagnetic means not shown, in simple harmonic motion at a frequency of 50 cycles per second, first in a direction, from the viewpoint of FIG. 1, to the right and upwards and then in a direction to the left and downwards, the angle of the direction of movement of any point in the vibrator plate 7 to the horizontal, as seen in FIG. 1, being approximately 35°, and the extent of movement, and therefore of the vertical component of the movement between the extreme positions, being capable of being varied. (The width of the vibrator plate 7 was 2.5 inches, (6.35 cm.).)

In operation, hoppers 1 were both filled with pellets of thickness, that is height, of one-eighth inch (3 mm.) and diameter three-sixteenths inch (4.8 mm.) and of weight 50 mg. The distance "$x$" was set at 0.145 inches (3.7 mm.) and the extent of movement of the vibrator plate 7 was arranged to be such that the vertical component of movement was 3 thousandths of an inch (0.076 mm.). Successful delivery of pellets was effected at a rate of 200 pellets per minute.

When the hoppers were both filled with pellets of thickness three-sixteenths inch (4.8 mm.) and diameter five-sixteenths inch (8 mm.) and of weight 250 mg., the vertical component of movement was arranged to be 4 thousandths of an inch (0.1 mm.), and the distance "$x$" was set at 0.220 inches (5.6 mm.) delivery of pellets was successfully effected at a rate of 120 pellets per minute.

Figure 3:
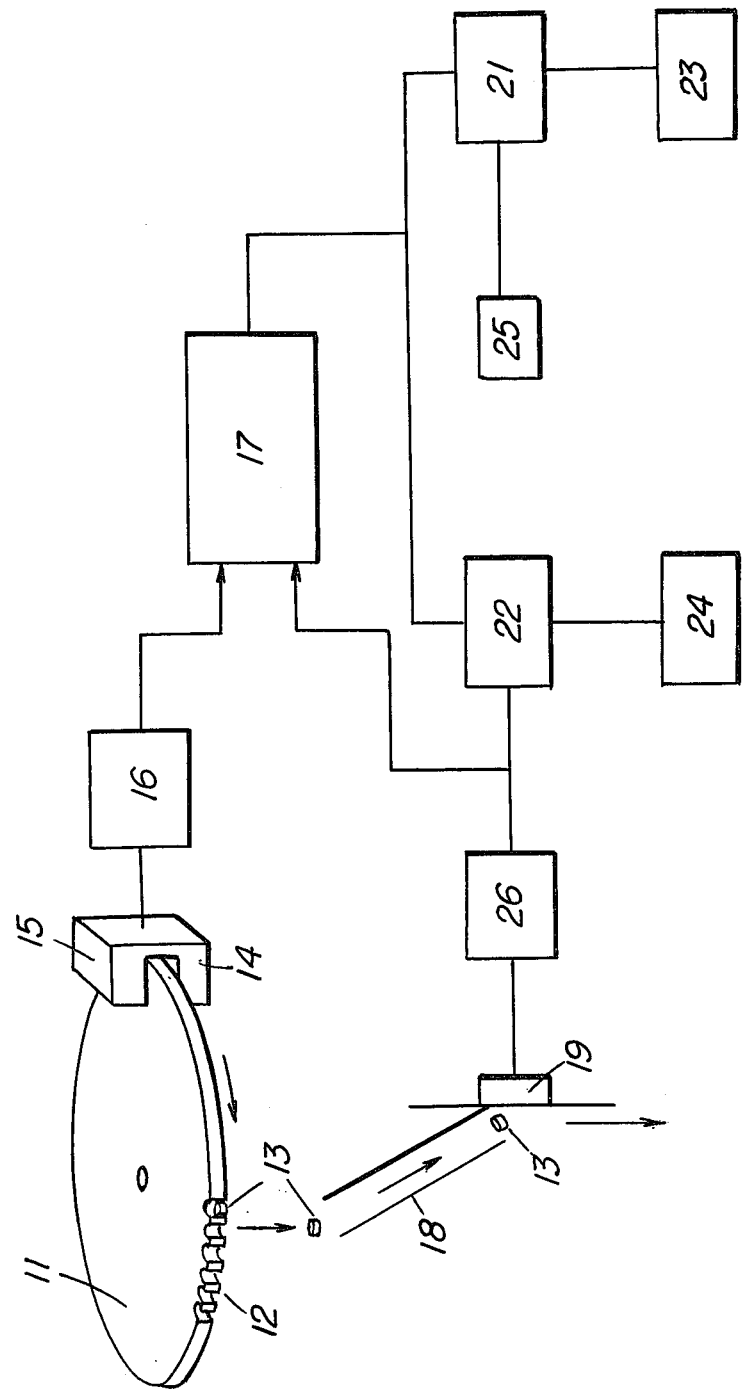
FIG. 3 shows a schematic representation of electronic means for sensing delivery of objects and comparing the rate of delivery with the predetermined rate of delivery as fixed by rate of passage of temporary retention stations past a fixed point.

Referring to FIG. 3, a disc 11, such as is numbered 6 in FIG. 1, bears indentations 12, which occur at equal intervals around the whole of the periphery of the disc 11 but of which only six are indicated in FIG. 1, and which serve as temporary retention stations which are fed with objects by auxiliary equipment such as shown in FIG. 1. Disc 11 is rotated in the direction of the arrow. Before passing the position at which the objects are fed to the temporary receiving stations the passage of each indentation 12 is detected by the photocell 15 in conjunction with lamp 14 and an impulse is sent through the amplifier 16 to the coincidence detector 17. An object 13 falling down the chute 18 impinges on the microphone 19, produces an impulse which is sent through the amplifier 20 and thence to the coincidence detector 17. When the coincidence detector 17 detects any difference between the number of temporary retention stations which have passed the photocell 15 up to any given moment and the number of objects which have impinged on the microphone 19, an impulse is generated. The coincidence detector 17 feeds the impulse to the cumulative counter 21 which shows the total number of such impulses which have occurred up to any given moment. The coincidence detector 17 also feeds impulses to the consecutive counter 22 which registers the number of such impulses which have occurred consecutively at any time. The number of impulses registered by the consecutive counter 22 is re-set to zero whenever an object impinges on the microphone 19. The alarm 23 is set to give warning of a predetermined total number impulses due to unacceptable differences between the number of retention stations passing the photocell 15 and the actual number of objects impinging on the microphone 19 over a given time interval. The internal pulser 25 provides re-set of the cumulative counter 21 at the desired time interval.

The alarm 24 is set to give a warning when a predetermined total number of consecutive impulses is registered by the consecutive counter 22.

What we claim is:

1. An improved process for the delivery of tablet-shaped objects of uniform height individually to a predetermined delivery point for incorporation in a mixture wherein a stream of objects at least one object in width is continually presented, by moving a forwarding means comprising a movable continuous planar area on to which a continuous supply of objects is fed and to which planar area is imparted an appropriate motion to ensure forwarding of the contacting objects thereon and wherein there is free space above the planar area and means limiting the free space to a thickness more than but less than twice the height of an object so as to prevent piling of one object on another but permitting lateral movement of the object, to a series of temporary retention stations for the objects moving laterally and unidirectionally across the stream of objects until the retention station reaches the predetermined delivery point whereupon the object is disengaged, wherein the improvement comprises:

moving said planar area out of sympathy with a fixed plate means limiting said free space above said planar area.

* * * * *